(12) United States Patent
Gustavsson et al.

(10) Patent No.: US 9,396,875 B2
(45) Date of Patent: Jul. 19, 2016

(54) TERMINAL BUSHING SEALING ELEMENT

(71) Applicant: ABB TECHNOLOGY LTD, Zürich (CH)

(72) Inventors: Roger Gustavsson, Ludvika (SE); Petter Johansson, Göteborg (SE)

(73) Assignee: ABB TECHNOLOGY LTD, Zürich (CH)

( * ) Notice: Subject to any disclaimer, the term of this patent is extended or adjusted under 35 U.S.C. 154(b) by 0 days.

(21) Appl. No.: 14/888,589

(22) PCT Filed: Jun. 14, 2013

(86) PCT No.: PCT/EP2013/062345
§ 371 (c)(1),
(2) Date: Nov. 2, 2015

(87) PCT Pub. No.: WO2014/198329
PCT Pub. Date: Dec. 18, 2014

(65) Prior Publication Data
US 2016/0093435 A1    Mar. 31, 2016

(51) Int. Cl.
*H02K 5/24* (2006.01)
*H01G 2/10* (2006.01)
*H01G 4/224* (2006.01)
*H01G 4/236* (2006.01)
*G10K 11/16* (2006.01)

(52) U.S. Cl.
CPC ............... *H01G 2/103* (2013.01); *G10K 11/16* (2013.01); *H01G 4/224* (2013.01); *H01G 4/236* (2013.01)

(58) Field of Classification Search
CPC ........................................................ H02K 5/24
USPC ........................................................ 181/202
See application file for complete search history.

(56) References Cited

U.S. PATENT DOCUMENTS

| | | |
|---|---|---|
| 2,896,008 A | 7/1959 | Putz |
| 3,097,346 A | 7/1963 | Horelick et al. |
| 3,388,211 A | 6/1968 | Nichols et al. |
| 4,797,513 A | 1/1989 | Ono et al. |
| 4,846,163 A | 7/1989 | Bannister, Jr. et al. |
| 4,982,812 A * | 1/1991 | Hwang .............. F24F 13/24 181/202 |
| 5,608,191 A | 3/1997 | Teixido |

(Continued)

FOREIGN PATENT DOCUMENTS

| | | |
|---|---|---|
| CN | 201084547 Y | 7/2008 |
| CN | 201178032 Y | 1/2009 |

(Continued)

*Primary Examiner* — Forrest M Phillips
(74) *Attorney, Agent, or Firm* — Birch, Stewart, Kolasch & Birch, LLP

(57) ABSTRACT

A terminal bushing sealing element is adapted to be fitted between a terminal bushing and a barrier element. The sealing element is elastic, has an annular shape, and includes a wall with an inner surface and an outer surface. A first opening is provided at a first end of the sealing element and a second opening is provided at a second end of the sealing element, which is opposite to the first end and the wall extends between the first end and the second end. The wall includes a first wall portion that is inclined such that a diameter of the sealing element increases from the first end in the direction towards the second end. The sealing element provides for improved sound attenuation while maintaining a long creepage distance and may be used in sound attenuation casings that are included in power capacitor arrangements.

18 Claims, 6 Drawing Sheets

(56) References Cited

U.S. PATENT DOCUMENTS

| | | | | |
|---|---|---|---|---|
| 5,929,394 | A * | 7/1999 | Westerbeke, Jr. | E04B 1/8218 181/202 |
| 6,129,176 | A * | 10/2000 | Hunsberger | F01C 21/10 181/198 |
| 8,876,092 | B2 * | 11/2014 | Wojcieson | H02K 5/24 248/604 |
| 9,169,837 | B2 * | 10/2015 | Pascual | F01C 21/007 |
| 9,276,449 | B2 * | 3/2016 | Kezar | H02K 5/1672 |
| 2002/0079131 | A1 | 6/2002 | Servies | |
| 2008/0099275 | A1 * | 5/2008 | Seel | F04B 39/0033 181/202 |
| 2012/0055696 | A1 | 3/2012 | Martinez et al. | |

FOREIGN PATENT DOCUMENTS

| | | |
|---|---|---|
| CN | 201185541 Y | 1/2009 |
| CN | 201199484 Y | 2/2009 |
| CN | 101577179 A | 11/2009 |
| CN | 201359907 Y | 12/2009 |
| CN | 201364819 Y | 12/2009 |
| CN | 201518280 U | 6/2010 |
| CN | 201576561 U | 9/2010 |
| CN | 201966068 U | 9/2011 |
| CN | 202189678 U | 4/2012 |
| CN | 202258815 U | 5/2012 |
| CN | 103065790 A | 4/2013 |
| EP | 0 682 346 B1 | 9/1999 |
| FR | 2.221.837 A1 | 10/1974 |
| FR | 2 809 877 A1 | 12/2001 |
| JP | 6-342733 A | 12/1994 |
| JP | 8-330184 A | 12/1996 |
| JP | 10106886 A | 4/1998 |

* cited by examiner

TERMINAL BUSHING SEALING ELEMENT

TECHNICAL FIELD

The present invention relates to the field of terminal bushing seals for use in sound attenuation casings for power capacitors, sound attenuation enclosures for power capacitor units, capacitor sound attenuation arrangements and power capacitor arrangements.

BACKGROUND

Power capacitors are components in systems for transmission and distribution of electric power for both alternating current and direct current. In power capacitor installations, a plurality of capacitor units is interconnected via series and/or parallel connection in a capacitor bank. Capacitor banks comprise a plurality of capacitor units that may produce noise which can become a problem for the surrounding environment. In order to reduce noise from the capacitor units, partial and/or complete sound attenuation casings or enclosures have been used.

When enclosing capacitor units in sound attenuation enclosures or noise reducing enclosures some noise may pass through openings through which terminal bushings extend. Also, water and moisture can enter into the enclosures, which is undesired.

It is previously known to arrange a sealing element between a terminal bushing and an opening in the sound attenuation enclosure. Terminal bushings comprise sheds which are insulating parts that project from an insulator trunk and are intended to increase the creepage distance in a bushing. By arranging a sealing element in the opening of the sound attenuation enclosure and in abutment with sheds of the terminal bushing, the creepage distance of the terminal bushing is often reduced which is undesired. In order to compensate for the creepage distance loss longer and more expensive cable bushings have therefore been used.

There is a need to reduce noise from capacitor units while at the same time there is a desire to maintain the creepage distance along the terminal bushing as long as possible.

SUMMARY OF THE INVENTION

The object of the present invention is thus to provide a terminal bushing sealing element which safely isolates the inside of an enclosure including the terminal bushing against environmental impacts, such as moisture and water.

Another object of the invention is to provide a terminal bushing sealing element which retains as long creepage distance as possible for the bushing.

Another object of the invention is to provide a terminal bushing sealing element which can be used in connection with a plurality of different sound attenuation arrangements.

A further object of the invention is to provide a capacitor sound attenuation arrangement which reduces the noise from capacitor units.

The objects of the invention have been achieved by the terminal bushing sealing element defined in the appended claims.

According to a first aspect of the invention, the present invention relates to a terminal bushing sealing element, adapted to be fitted between an terminal bushing and a barrier element, which sealing element is elastic, has an annular shape, and comprises a wall with an inner surface and an outer surface. A first opening is provided at a first end of the sealing element and a second opening is provided at a second end of the sealing element that is opposite to the first end. The wall extends between the first end and the second end. The wall may comprise a first wall portion that is inclined such that the diameter of the sealing element increases from the first end of the sealing element in the direction towards the second end of the sealing element. By providing the sealing element with an inclined wall portion and thus achieving an essentially frustoconical shape for the sealing element, any water that might exist inside the sealing element, between the sealing element and the terminal bushing, will flow outwards from the barrier element instead of inwards, since the capacitor units and sealing elements are placed horizontally in power capacitor arrangements. Thus the sealing element according to the present invention isolates the capacitor unit against environmental impacts, such as against moisture and water.

The first wall portion of the sealing element is preferably inclined with an angle $\alpha$ in relation to the centre line of the sealing element. The angle $\alpha$ may be between 1°-45°, such as between 3°-25°. The angle of inclination provides a sealing element which safely seals against moisture and water while at the same time easy installation of the sealing element may be obtained.

The first wall portion, adjacent to the first end of the sealing element, is preferably provided with a radially inwardly extending circumferential protrusion. This protrusion provides for improved seal between the terminal bushing and the barrier element. Also, the distance between the wall of the sealing element and the sheds of the terminal bushing can be increased.

The protrusion is preferably arc shaped and extends essentially in the direction away from the first end of the sealing element towards the second end of the sealing element, and forms a circumferential open channel with the first wall portion. The open channel, which may be U-shaped in cross-section, prevents rain water from entering inside the capacitor unit through the barrier element. Due to the arc-shape of the protrusion, the sealing element provides an effective sealing in proximity of the first end of the sealing element even when the wall of the sealing element is thin.

A spherical sealing protrusion may be integrated with the first end. This spherical protrusion forms a convex inner surface for the first end. This rounded first end, provides a similar effect as an O-ring, and thus provides an improved seal against the barrier element.

A first radially outwardly extending circumferential flange may be provided at the first end of the sealing element and a second radially outwardly extending circumferential flange may be provided at a distance from the first flange. The flanges form a first outer groove with the first wall portion. The first outer groove is adapted to be fitted to an opening in a barrier element. In such a way a sealing element which seals tightly an opening in a barrier element, and improves the sound attenuation, is achieved.

The second flange of the sealing element may be tapered in a direction radially outwards from the wall, such that any water falling onto the flange will flow in a direction away from the sealing element. In this way a sealing element which further improves sealing against moisture and water is achieved.

According to one embodiment, the wall comprises a second wall portion that extends beyond the first wall portion, in the direction away from the first end. The second wall portion may comprise at least one radially outwardly directed circumferential flange means and a second outer groove. The second groove is adapted to be fitted to an opening in a second barrier element.

A slit may be provided in the wall separating the second wall portion and the first wall portion. The slit makes it possible to tear off the second wall portion from the first wall portion in case where only one barrier element is used. In this way, the same sealing element can be used with one or two barrier elements and can thereby be used with a plurality of different sound attenuating arrangements.

The thickness of the wall may vary from the first end to the second end such that the wall is thicker at the second end. The thickness of the first wall portion may be varied such that the outer surface of the first wall portion is inclined but the inner surface is essentially in line with the centre line of the sealing element.

The sealing element preferably comprises silicone rubber, EPDM or another material with similar electrical and mechanical properties. Especially silicone rubber provides a long service life in outdoor applications while maintaining the isolating and mechanical properties and it may facilitate the manufacturing process.

The objects of the invention may also be achieved by a sound attenuation casing as defined in the appended claims.

The present invention thus relates to a sound attenuation casing for a capacitor unit that comprises the sealing element as described above, and wherein the sound attenuation casing forms the barrier element. The sound attenuation casing is preferably provided with at least one opening through which the terminal bushing of the capacitor unit extends. The sealing element is adapted to be fitted in the at least one opening to make a seal between the terminal bushing and the sound attenuation casing. The sound attenuation casing combined with the sealing element forms an improved sound attenuation solution compared to the prior art solutions, also safe sealing against moisture and water.

The at least one opening in the sound attenuation casing is preferably essentially frustoconical and has a larger diameter towards an outer surface of the casing than towards an inner surface of the casing. The conicity, i.e. the inclination or the funnel shape, of the opening corresponds preferably to the inclination of the first wall portion of the sealing element and thus a tight seal between the sealing element and the sound attenuation casing can be provided.

The sound attenuation casing may comprise a base and four sides extending perpendicular to the base and surrounding the base. The base comprises the at least one opening, such as two openings. Thus, for example a rectangular parallelepiped open-ended shape for the casing may be provided.

The sound attenuation casing preferably comprises a sealing gasket, which is adapted to be fitted between the side walls of the sound attenuation casing and a capacitor unit. This further improves the sound attenuation ability of the casing.

The sound attenuation casing comprising the sealing element may be combined with a second sound attenuation casing arranged on the opposite end of the capacitor unit, whereby the casings together partially enclose the capacitor unit. Thus, further improved sound attenuation can be provided.

The objects of the invention may also be achieved by a capacitor sound attenuation arrangement as defined in the appended claims.

Thus, the present invention also relates to a capacitor sound attenuation arrangement comprising a sound attenuation casing described above.

The capacitor sound attenuation arrangement may comprise a sound attenuation enclosure that encloses the sound attenuation casing. The sound attenuation enclosure may have at least one opening through which the terminal bushing of the capacitor unit extends. By combining the sound attenuation casing with the sound attenuation enclosure, and thus provide two barrier elements, a further improved sound attenuation arrangement is obtained.

In the case where the sealing element comprises flange means forming a second outer groove, the flange means and the second outer groove are adapted to be fitted to the at least one opening of the sound attenuation enclosure. Thus, sealing may be provided with one single sealing element between the terminal bushing and the enclosure and between terminal bushing the terminal bushing and the sound attenuation casing.

The objects of the invention may also be achieved by a power capacitor arrangement as defined in the appended claims.

Thus, the present invention further relates to a power capacitor arrangement that comprises a capacitor unit and the capacitor sound attenuation arrangement as described above.

The capacitor unit preferably comprises at least one terminal bushing and the sealing element is in the power capacitor arrangement arranged in abutment with a shed of the terminal bushing, which shed is the shed closest to the capacitor unit. In this way, a long creepage distance utilizing the length of the bushing can be obtained.

The radially inwardly extending circumferential protrusion of the sealing element is preferably arranged in abutment with the shed of the terminal bushing. In this way, effective sound attenuation and isolation against the surrounding environment can be provided.

The first end of the sealing element may be arranged in abutment with a base of the terminal bushing. In this way, the bushing can be isolated from the interior of the capacitor unit.

As mentioned above, by arranging the sealing element in abutment with the shed of the terminal bushing that is closest to the capacitor unit, the creepage distance of the terminal bushing is kept as long as possible while at the same time an improved sound attenuation is achieved by means of the sound attenuation casing and the sound attenuation enclosure.

The foregoing and other objects and advantages of the present invention will be apparent to those skilled in the art, in view of the following detailed description, taken in conjunction with the appended claims and the accompanying drawings.

BRIEF DESCRIPTION OF THE DRAWINGS

The present invention will now be described by way of examples with references to the accompanying schematic drawings, of which.

DETAILED DESCRIPTION

Hereinafter, embodiments of the present invention will be described in detail with reference to the accompanying drawings, wherein for the sake of clarity and understanding of the invention some details will not be described in connection with each drawing.

Figures 1, 7:
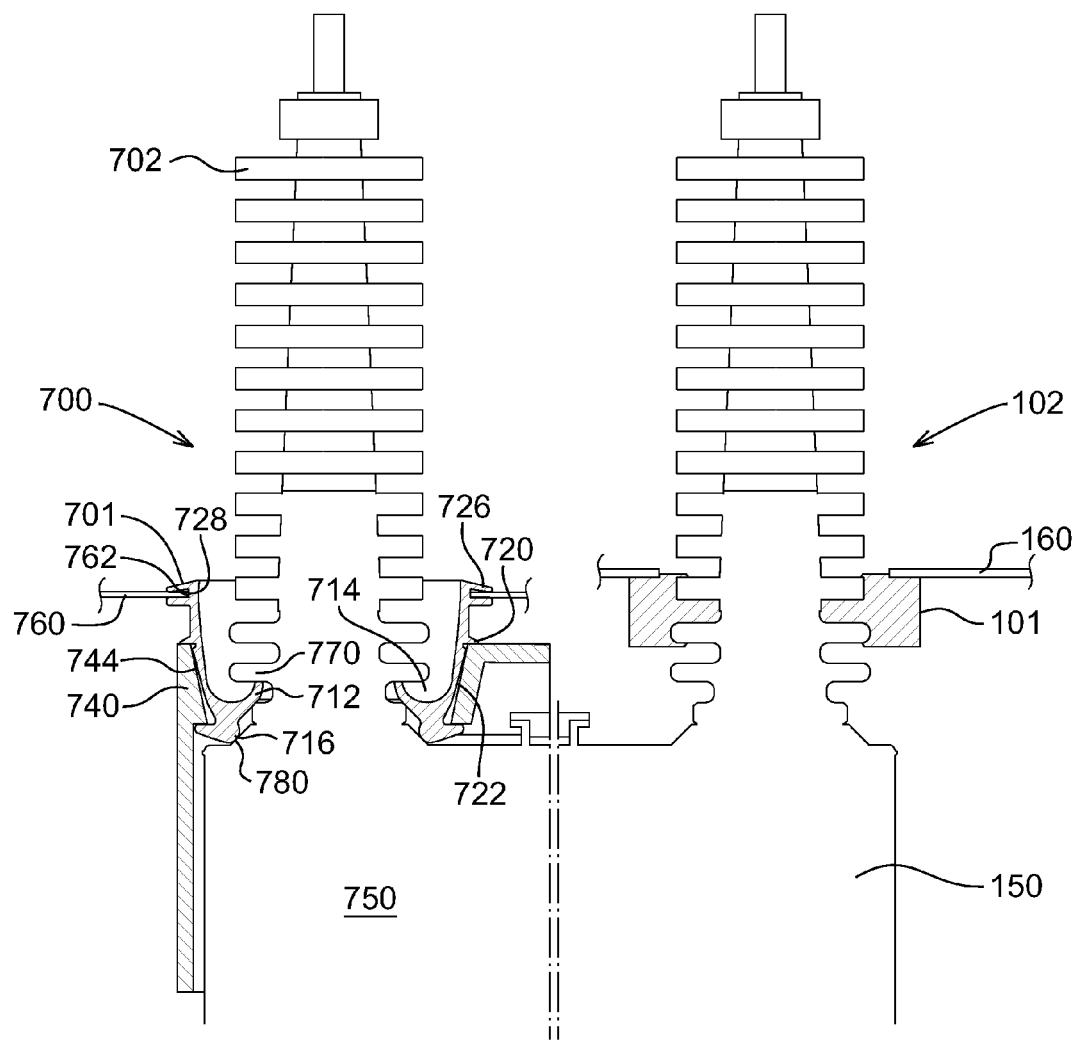
FIG. 1 illustrates a prior art power capacitor arrangement.
FIG. 7 illustrates a power capacitor arrangement comprising a terminal bushing sealing element according to an embodiment of the invention.

FIG. 1 shows a prior art power capacitor arrangement where a single sound attenuation enclosure 160 is used. It should be noted that the power capacitor arrangements are usually placed horizontally, but are illustrated in a vertical upright position in the present FIGS. 1 and 4-7. The arrangement further comprises a capacitor unit 150 with a terminal bushing 102, where the terminal bushing 102 extends through an opening in the sound attenuation enclosure 160. A sealing element 101 is arranged at the opening of the sound attenuation enclosure 160, surrounding the terminal bushing 102. By arranging the sealing element 101 at a distance from the base of the terminal bushing 102, the creepage distance of terminal bushing 102 is reduced, which is undesirable.

Figure 2:
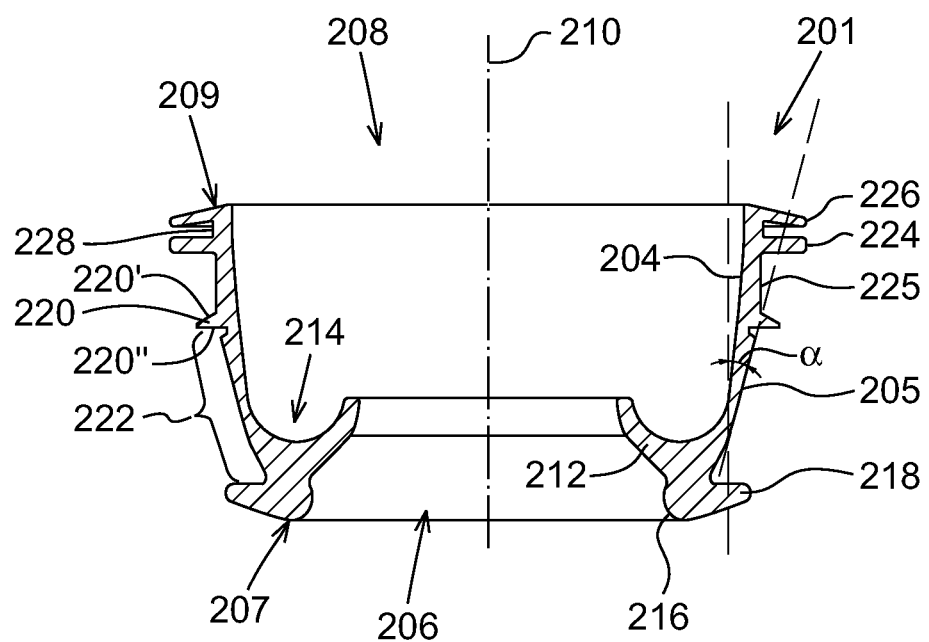
FIG. 2 illustrates a a cross-sectional view of an terminal bushing sealing element according to a first embodiment of the invention.

FIG. 2 illustrates a cross-sectional view of an embodiment of a terminal bushing sealing element 201 according to the present invention that is adapted to be fitted between a terminal bushing and a barrier element. In this connection, reference is also made to the three-dimensional view of the sealing element 201. The sealing element 201 is elastic, by which is meant a material that can retain to substantially its original shape after deformation. The sealing element 201 has an annular shape, and comprises a wall 204 with an inner surface and an outer surface. A first opening 206 is provided at a first end 207 of the sealing element 201 and a second opening 208 is provided at a second end 209 of the sealing element 201. The first end 207 and the second end 209 are arranged opposite to each other and the wall 204 extends between the first end 207 and the second end 209. The wall 204 comprises a first wall portion 205, extending from the first end 207, that is inclined such that the diameter of the sealing element 201 is increased from the first end 207 in the direction towards the second end 209. The first wall portion 205 is inclined with an angle α in relation to a centre line 210 of the sealing element 201. The centre line 210 extends in a direction perpendicular to the diameter of the first and the second openings 206, 208, respectively. The thickness of the first wall portion 205 is reduced towards the first end 207 of the sealing element 201 and the outer surface of the first wall portion 205 is inclined in relation the centre line 210. The angle of inclination is indicated by a in FIG. 2. Thus, the inner surface of the first wall portion 205 extends substantially nearly in the same direction as the centre line 210, i.e. the inner surface may have a smaller inclination in respect to the centre line 210 than the outer surface.

The first wall portion 205, adjacent to the first end 207 of the sealing element 201, is provided with a radially (r) inwardly extending circumferential protrusion 212. The protrusion 212 may be configured as a lip. The protrusion 212 is arc shaped and extends essentially in the direction away from the first end 207 towards the second end 209 of the sealing element 201. The thickness of the protrusion 212 is increased closest to the first wall portion 205. The protrusion 212 forms an open circumferential channel 214 with the first wall portion 205. Since the protrusion 212 extends radially inwardly, the diameter of opening surrounded by the channel 214 is smaller than the diameter of the first opening 206 in proximity of the first end 207. The inclined first wall portion 205 and the channel 214 make sure that any water entering the sealing element 210 is transported out from the sealing element 201.

A spherical sealing protrusion 216 is integrated with the first end 207 of the sealing element 201, forming a convex inner surface of the first end 207. Also integrated with the first end 207 is a first radially outwardly extending circumferential flange 218. The first flange 218 has a tapered side which side faces away from the second end 209, such that the thickness of the first flange 218 is reduced in radially outward direction. The side that faces away from the second end 209 corresponds to the side that is illustrated below in connection with a second circumferential flange 220 and depicted as 220". The second circumferential flange 220 extends radially outwardly and is provided at a distance from the first flange 218 at the end of the first wall portion 205. The flanges 218, 220 form a first circumferential outer groove 222 with the first wall portion 205.

The second flange 220 is tapered so that the thickness of the flange 220 is reduced radially outwards. As can be seen from FIG. 2, the flange 220 has a side (220') facing away from the first end 207 and the side (220") facing towards the first end 207 and facing away from the second end 209 as referred to above. The side facing away 220' from the first end 207 is tapered.

The thickness of the first flange 218 and the second flange 220 is defined as the extension in the direction along the length of the wall 204, i.e. the length between the first end 207 and the second end 209.

The sealing element 201 further comprises a second wall portion 225 that extends beyond the first wall portion 205, in the direction away from the first end 207, and ends at the second end 209 of the sealing element 201. The second wall portion 225 extends essentially with same inclination in relation to the centre line 210 as the first wall portion 205. The second wall portion 225 comprises radially outwardly directed circumferential flange means 224, 226 arranged at a distance from each other. The flange means 226 is arranged at the second end 209 of the sealing element 201. Flange means 226 is tapered on a side facing away from the first end 207 of the sealing element 201, such that the thickness of the flange means 226 is reduced radially outwards. The thickness of the flange means 224, 226 is defined as the extension in the direction along the length of the wall 204. The flange means 224, 226 forms a second outer groove 228 with the second wall portion 225. The length of the second wall portion 225 may be shorter than the length of the first wall portion 205 and the distance between the flange means 224, 226 may be shorter than the distance between the first and second flange 218, 220. The thickness of the second wall portion 225 may be greater than the thickness of the first wall portion 205, as illustrated in FIG. 2.

Figure 3:
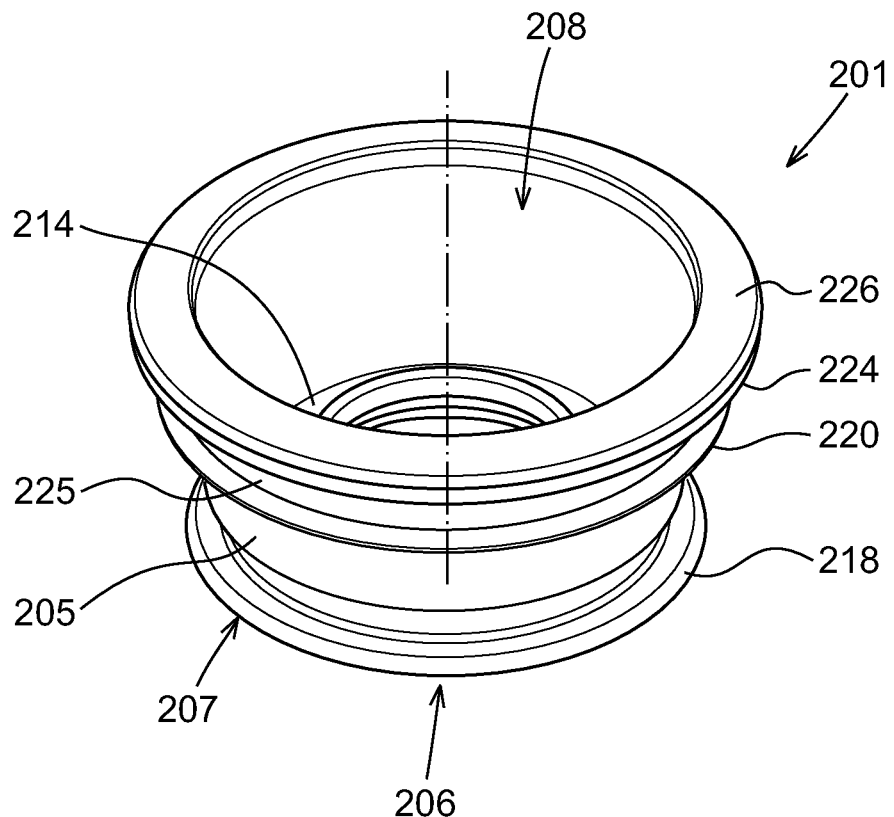
FIG. 3 illustrates a three dimensional view of the terminal bushing sealing element according to FIG. 2.

FIG. 3 illustrates a three dimensional view of the terminal bushing sealing element 201 shown in FIG. 2.

Figure 4:
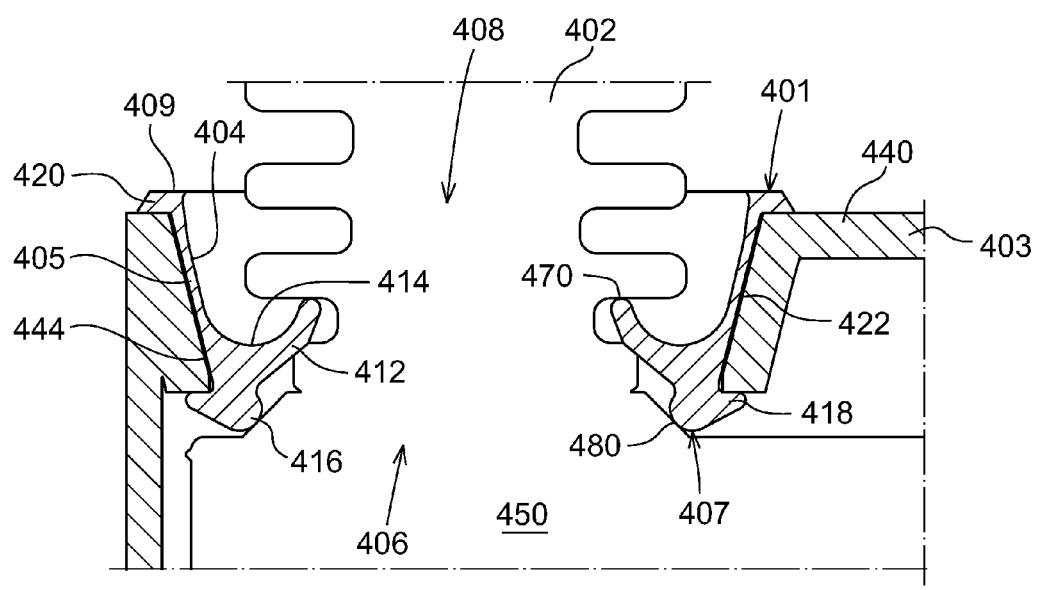
FIG. 4 illustrates a cross-sectional view of a terminal bushing sealing element according to an alternative embodiment of the invention.

FIG. 4 illustrates a cross-sectional view of a terminal bushing sealing element 401 adapted to be fitted between a terminal bushing and a barrier element according to an alternative embodiment of the present invention. The sealing element 401 is arranged between a terminal bushing 402 of a capacitor unit 450 and a sound attenuation casing 440 forming a barrier element 403, partially surrounding the capacitor unit 450. The sound attenuation casing 440 is provided with an opening 444 through which the terminal bushing 402 extends. The sealing element 401 is adapted to be fitted in the opening 444.

Also in this embodiment, the sealing element 401 is elastic, has an annular shape, and comprises a wall 404 with an inner surface and an outer surface, wherein a first opening 406 is provided at a first end 407 of the sealing element 401 and a second opening 408 is provided at a second end 409 of the sealing element 401.

The first end 407 and the second end 409 are arranged opposite each other and the wall 404 extends between the first end 407 and the second end 409. The wall 404 comprises a first wall portion 405 that is inclined such that the first opening 406 has a smaller diameter than the second opening 408 and fits around the terminal bushing 402. The sealing element 401 is thus configured as having an essentially funnel or frustoconical shape. The opening 444 in the sound attenuation casing 440 is correspondingly conically shaped and has a larger diameter towards an outer surface of the casing 440. The inclination of the walls of the opening 444 corresponds to the inclination of the first wall portion 405 of the sealing element 401.

The first wall portion 405, adjacent to the first end 407 of the sealing element 401, is provided with a radially inwardly extending circumferential protrusion 412. The protrusion 412 is arc-shaped and extends essentially in the direction away from the first end 407 towards the second end 409 of the sealing element 401. The thickness of the protrusion 412 increases closest to the first wall portion 405. The protrusion 412 forms an open circumferential channel 414 with the first wall portion 405. The diameter of the opening surrounded by the channel 414 is smaller than the diameter of the first opening 406.

A spherical sealing protrusion 416 is integrated with the first end 407 of the sealing element 401, forming a convex inner surface of the second end 407. Also integrated with the first end 407 is a first radially outwardly extending circumferential flange 418. The first flange 418 is tapered on the side facing away from the second end 409 such that the thickness of the first flange 418 is reduced in a direction radially outwards. A second radially outwardly extending circumferential flange 420 is provided at a distance from the first flange 418 at the second end 409 of the sealing element 401. The flanges 418, 420 form a first circumferential outer groove 422 with the first wall portion 405. The second flange 420 is tapered on the side facing away from the first end 407 of the sealing element 401, such that the thickness of the flange 420 is reduced radially outwards.

The sealing element 401 is arranged such that the spherical sealing protrusion 416 abuts against a base 480 of the terminal bushing 402. The base 480 is defined as the end of the terminal bushing 402 which is closest to the capacitor unit 450. The first flange 418 together with the spherical sealing protrusion 416 provides a seal between the capacitor unit 450 and the sound attenuation casing 440. The first outer groove 422 of the sealing element 401 is fitted with and abuts against the conically shaped opening 444 of the sound attenuation casing 440, with the second flange 420 of the sealing element 401 abutting against the outside of the sound attenuation casing 440. The end of the protrusion 412 extending inwards from the first wall portion 405 is in abutment with, i.e. abuts against, a shed 470 of the terminal bushing 402. The shed 470 is the shed closest to the capacitor unit 450. The sealing element 401 is arranged such that the protrusion 412 is in abutment with the shed 470 on the side of the shed 470 that is facing the capacitor unit 450. The shed 470 extends above and radially inwardly in the circumferential open channel 414 and the protrusion 412 thus provides a seal between the terminal bushing 402, the sound attenuation casing 440 and the capacitor unit 450.

Figure 5A:
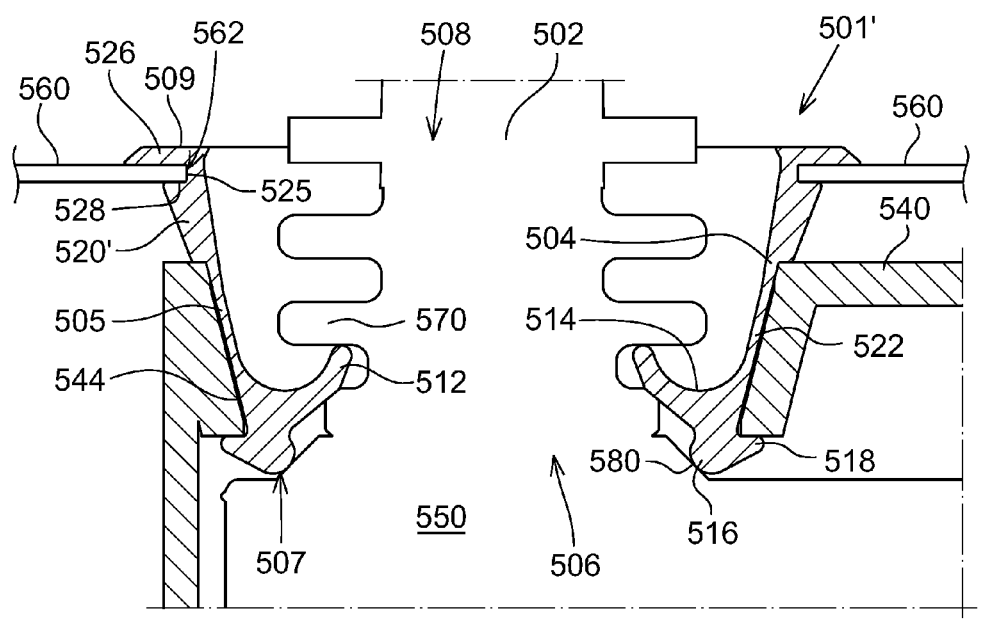
FIG. 5a illustrates a cross-sectional view of a terminal bushing sealing element according to a further embodiment of the invention.

FIG. 5a illustrates a cross-sectional view of a terminal bushing sealing element 501' adapted to be fitted between a terminal bushing and a barrier element according to a further embodiment according to the invention. The sealing element 501' is arranged between a terminal bushing 502 of a capacitor unit 550 and a sound attenuation casing 540 partially surrounding the capacitor unit 550. A sound attenuation enclosure 560 is arranged to substantially completely surround the sound attenuation casing 540 and the capacitor unit 550. The sound attenuation casing 540 is provided with an opening 544 and the sound attenuation enclosure 560 is provided with an opening 562, through which openings 544, 562 the terminal bushing 502 extends. The sealing element 501' is adapted to be fitted in the opening 544 and the opening 562, respectively.

The sealing element 501' is elastic, has an annular shape, and comprises a wall 504 with an inner surface and an outer surface, wherein a first opening 506 is provided at a first end 507 of the sealing element 501' and a second opening 508 is provided at a second end 509 of the sealing element 501'. The first end 507 and the second end 509 are arranged opposite each other and the wall 504 is extending between the first end 507 and the second end 509. The wall 504 comprises a first wall portion 505 that is inclined such that the diameter of the sealing element 501' is increasing from the first end 507 of the sealing element 501' in the direction towards the second end 509 of the sealing element 501'.

The first wall portion 505, adjacent to the first end 507 of the sealing element 501', is provided with a radially inwardly extending circumferential protrusion 512. The protrusion 512 is configured as a lip which is arc-shaped and extends essentially in the direction away from the first end 507 towards the second end 509 of the sealing element 501'. The thickness of the protrusion 512 increases closest to the first wall portion 505. The protrusion 512 forms an open circumferential channel 514 with the first wall portion 505. The diameter of the opening surrounded by the channel 514 is smaller than the diameter of the first opening 506.

A spherical sealing protrusion 516 is integrated with the first end 507 of the sealing element 501, forming a convex inner surface of the second end 507. Also integrated with the first end 507 and the spherical sealing protrusion 516 is a first radially outwardly extending circumferential flange 518. The first flange 518 is tapered on a side facing away from the second end 509 such that the thickness of the first flange 518 is reduced in a radially outwards direction. A second radially outwardly extending circumferential flange 520' is provided at a distance from the first flange 518 at the end of the first wall portion 505. The flanges 518, 520' form a first circumferential outer groove 522 with the first wall portion 505. The second flange 520' has a greater thickness than the first flange 518. The thickness of the flanges 518, 520' is defined as the extension of the flanges 518, 520' in the direction along the length of wall 504. The second flange 520' is tapered such that the width of the second flange 520' reduces in the direction towards the first end 507 of the sealing element 501'. The width of the flanges 518, 520' is defined as radial extensions of the flanges 518, 520' in the outwards direction from the wall 504.

The sealing element further comprises a second wall portion 525 that extends beyond the first wall portion 505 in the direction away from the first end 507. The second wall portion 525 starts from the second flange 520' and ends at the second end 509 of the sealing element 501'. The second wall 525 extends essentially with the same inclination in relation to the centre line 210 (shown in FIG. 2) as the first wall portion 505. The second wall portion 525 comprises a radially outwardly directed circumferential flange means 526 arranged at a distance from the second flange 520'. The flange means 526 is provided at the second end 509 of the sealing element 501'. The flange means 526 extends further longer away from the wall 504 in radially outward direction than the second flange 520'. The flange means 526 is tapered on a side facing away from the first end 507 of the sealing element 501', such that the thickness of the flange means 526 is reduced radially outwards. The thickness of the flange means 526 is defined as the extension of the flange means 526 in the direction along the length of the wall 504. The flange means 526 and the second flange 520' forms a second outer groove 528 with the second wall portion 525. The length of the second wall portion 525 is shorter than the length of the first wall portion 505 and the distance between the flange means 526 and the second flange 520' is shorter than the distance between the first and second flange 518, 520'. The thickness of the second wall portion 525 is preferably greater than the thickness of the first wall portion 505.

The sealing element 501' according to this embodiment of the invention is arranged such that the spherical sealing protrusion 516 abuts against a base 580 of the terminal bushing 502. The base 580 is defined as the end of the terminal bushing 502 which is closest to the capacitor unit 550. The first flange 518 together with the spherical sealing protrusion 516 provides a seal between the capacitor unit 550 and the sound attenuation casing 540. The first outer groove 522 of the sealing element 501' is fitted with and abuts against the conically shaped opening 544 of the sound attenuation casing 540, with the second flange 520' of the sealing element 501' abutting against the outside of the sound attenuation casing 540. The end of the protrusion 512 extending in the direction away from the wall 504 is arranged in abutment with and abutting against a shed 570 of the terminal bushing 502, the shed 570 being the shed closest to the capacitor unit 550. The sealing element 501' is further arranged such that the protrusion 512 is in abutment with, i.e. abuts against, the shed 570 on the side of the shed 570 that is facing the capacitor unit 550. In such a way the shed 570 extends radially inwards in the circumferential open channel 514 and the protrusion 512 provides a seal between the terminal bushing 502, the sound attenuation casing 540 and the capacitor unit 550. The second outer groove 528 of the sealing element 501' is fitted with and abuts against the opening 562 of the sound attenuation enclosure 560. The flange means 526 abuts against the outer surface of the sound attenuation enclosure 560.

Figure 5B:
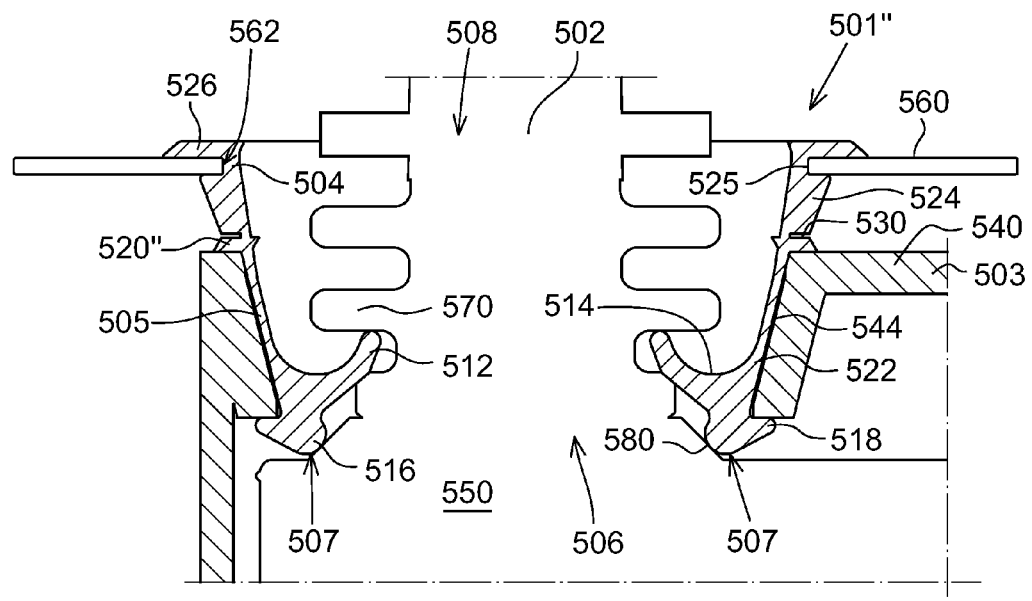
FIG. 5b illustrates a cross-sectional view of a terminal bushing sealing element according to a further embodiment of the invention.

FIG. 5b illustrates a cross-sectional view of a further embodiment of the terminal bushing sealing element 501" adapted to be fitted between a terminal bushing and a barrier element. The sealing element 501" is identical to the sealing element 501' described in FIG. 5a except that a slit 530 divides the second flange 520' as described in FIG. 5a into a second flange 520" and a flange means 524. The second flange 520" is provided at the end of the first wall portion 505 and the flange means 524 is provided on the second wall portion 525. The references to features in FIG. 5b that are identical to features in FIG. 5a are therefore the same as in FIG. 5a. The second flange 520" forms the first outer groove 522 with the first flange 518. The second flange 520" is tapered on a side facing away from the first end 507 of the sealing element 501", such that the thickness of the flange 520" is reduced radially outwards. The second wall portion 525 extends beyond the first wall portion 505, from the second flange 520" in the direction away from the first end 507 of the sealing element 501", and ends at the second end 509 of the sealing element 501". The flange means 524 has a greater thickness than the flange means 526. The thickness of the flange means 524, 526 is defined as the extension of the flange means 524, 526 in the direction along the length of the wall 504. The flange means 524 is tapered such that the width of the flange means 524 is reduced in the direction towards the first end 507 of the sealing element 501". The width of the flange means 524, 526 is defined as the extension of the flange means 524, 526 in the radially outwards direction from the wall 504.

The slit 530 is provided in the wall 504 separating the second wall portion 525 and the first wall portion 505. The slit 530 makes it possible to tear off the second wall portion 525 from the first wall portion 505 and thus achieve the sealing element 401 described in FIG. 4 that is usable in arrangements comprising only the sound attenuation casing, but not the outer enclosure.

The sealing element 501" according to this embodiment of the invention is also arranged such that the spherical sealing protrusion 516 abuts against the base 580 of the terminal bushing 502. The first flange 518 together with the spherical sealing protrusion 516 provides a seal between the capacitor unit 550 and the sound attenuation casing 540. The first outer groove 522 of the sealing element 501" is fitted with and abuts the conically shaped opening 544 of the sound attenuation casing 540, with the second flange 520" of the sealing element 501" abutting the outside of the sound attenuation casing 540. The end of the protrusion 512 that extends away from the wall 504 is arranged in abutment with and abutting against the shed 570 of the terminal bushing 502, the shed 570 being the shed closest to the capacitor unit 550. The sealing element 501" is further arranged such that the protrusion 512 is in abutment with the shed 570 on the side of the shed 570 that is facing the capacitor unit 550. In such a way the shed 570 extends radially inwardly in the circumferential open channel 514 and the protrusion 512 provides a seal between the terminal bushing 502, the sound attenuation casing 540 and the capacitor unit 550. The second outer groove 528 of the sealing element 501" is fitted with and abuts against the opening 562 of the sound attenuation enclosure 560. The flange means 526 abuts against the outer surface of the sound attenuation enclosure 560.

Figure 6:
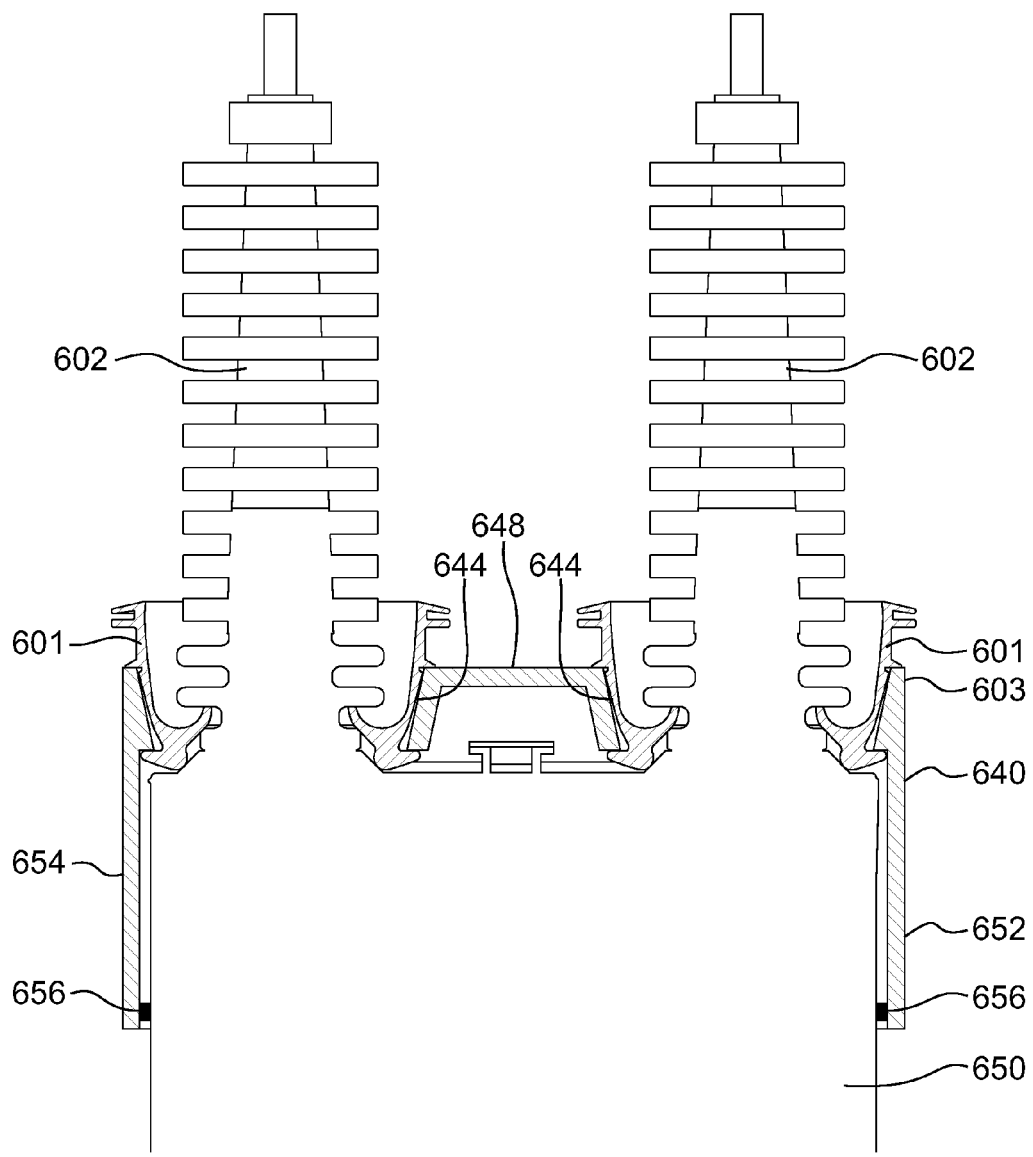
FIG. 6 illustrates a sound attenuation casing comprising a terminal bushing sealing element according to an embodiment of the invention.

FIG. 6 illustrates a cross-sectional view of a sound attenuation casing 640 for a capacitor unit 650, comprising two electrical busing sealing elements 601. The sealing element 601 is configured as any of the sealing elements described in FIG. 2-FIG. 5b. The sound attenuation casing 640 forms a barrier element 603 and comprises a base 648 and four side walls 652, 654 extending perpendicular to the base 648 and surrounding the base 648. The base 648 comprises at least one opening 644, and as shown in FIG. 6, two openings, through which terminal bushings 602 extend. The sealing element 601 is adapted to be fitted in the opening 644. The sound attenuation casing may 640 further comprise a sealing gasket 656, which is adapted to be fitted between the side walls 652, 654 of the sound attenuation casing 640 and the capacitor unit 650. The sealing gasket is optional and may be left out.

FIG. 7 illustrates a power capacitor arrangement 700 according to the present invention. FIG. 7 is placed beside the prior art solution in FIG. 1 to illustrate the differences between the present solution and the prior art solution at least in respect of the creepage distance. As can be seen, the creepage distance along a terminal bushing 702 is longer in the present solution due to the shape of the sealing element than in the prior art solution, in which creepage loss occurs due to the shape and placement of the sealing element 101.

The power capacitor arrangement 700 comprises a capacitor unit 750, a sound attenuation casing 740 comprising a sealing element 701, and a sound attenuation enclosure 760.

The sealing element 701 is identical to the sealing element 201 described in FIG. 2. The sound attenuation casing 740 is identical to any of the sound attenuation casings 440, 540, 640 described in FIG. 4-FIG. 6 and the sound attenuation enclosure 760 is identical to the sound attenuation enclosure 560 described in FIG. 5a and FIG. 5b.

The sealing element 701 is arranged between a terminal bushing 702 of the capacitor unit 750 and the sound attenuation casing 740. The sound attenuation casing 740 partially surrounds the capacitor unit 750. The sound attenuation enclosure 760 is arranged to substantially completely surround the sound attenuation casing 740 and the capacitor unit 750. The sound attenuation casing 740 is provided with an opening 744 and the sound attenuation enclosure 760 is provided with an opening 762, through which openings 744, 762 the terminal bushing 702 extends. The sealing element 701 is fitted in the opening 744 and the opening 762.

The sealing element 701 is arranged such that the spherical sealing protrusion 716 abuts against a base 780 of the terminal bushing 702. The first flange 718 together with the spherical sealing protrusion 716 provides a seal between the capacitor unit 750 and the sound attenuation casing 740. The first outer groove 722 of the sealing element 701 is fitted with and abuts against the conically shaped opening 744 of the sound attenuation casing 740, with the second flange 720 of the sealing element 702 abutting against the outside of the sound attenuation casing 740. The end of the protrusion 712 that extends outwards from the first wall portion 705 is arranged in abutment with and abutting against a shed 770 of the terminal bushing 702, the shed 770 being the shed closest to the capacitor unit 750. The sealing element 702 is further arranged such that the protrusion 712 is in abutment with the shed 770 on the side of the shed 770 that is facing the capacitor unit 750. In such a way the shed 770 extends radially inwards in the circumferential open channel 714 and the protrusion 712 provides a seal between the terminal bushing 702, the sound attenuation casing 740 and the capacitor unit 750. The second outer groove 728 of the sealing element 701 is fitted with and abuts the opening 762 of the sound attenuation enclosure 760. The flange means 726 abuts against the outer surface of the sound attenuation enclosure 760. In this way, a power capacitor arrangement 700 which attenuate the sound and which safely seals against moisture and water is provided, while at the same time the creepage distance along the terminal bushing 702 is kept as long as possible.

Figure 8:
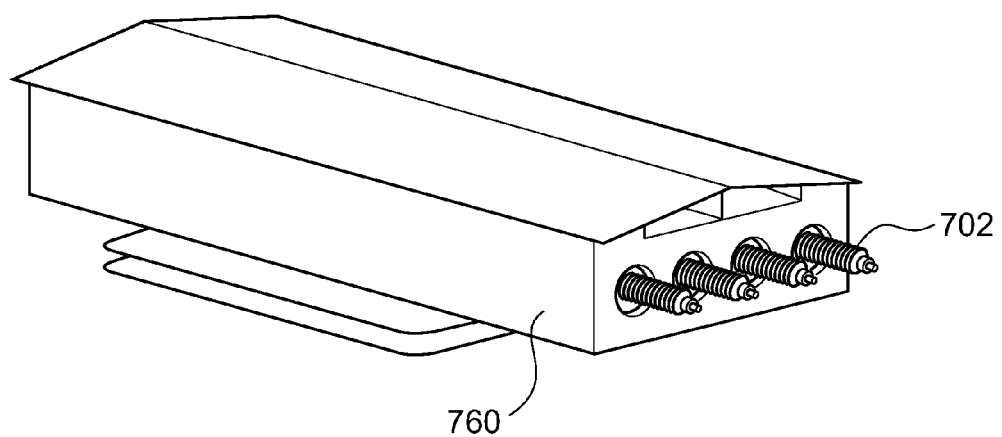
FIG. 8 illustrates a perspective view of the power capacitor arrangement according to FIG. 7.

FIG. 8 illustrates a perspective view of the power capacitor arrangement 700 described in FIG. 7. The capacitor unit 750 is placed horizontally and comprises in FIG. 8 eight terminal bushings 702 and the sound attenuation enclosure 760 is arranged to substantially completely surround the sound attenuation casing 740 and the capacitor unit 750.

In the sealing element, the radially inwardly extending circumferential protrusion forming the circumferential open channel can be arranged in abutment with any shed of the terminal bushing. The radially inwardly extending circumferential protrusion can be configured in any appropriate shape, such as a lip, bulb, rib, rim or similar.

The thickness of flanges or flange means is as described above in connection with the drawings defined as the extension of the flanges or flange means in the direction along the length (elongation) of the wall between the first and the second ends. The width of the flanges or the flange means is defined as the extension of the flanges or flange means in the radially outward direction away from the wall.

The tapering of the flanges and/or flange means can start from the wall or it can start anywhere along the width of the flange or flange means in the radially outward direction.

The centre line of the sealing element extends perpendicular to the diameter of the first and the second openings of the sealing element. The radial direction extends perpendicular to the centre line.

The inclination of the first wall portion of the sealing element and the opening of the sound attenuation casing can be for example between 1 to 45 degrees, such as between 3-25 degrees.

Some examples for the dimensions for the sealing element are listed below. These dimensions do not limit the scope of the invention that is defined in the appended claims and it is clear to the skilled person that the dimensions can vary depending on the application.

The diameter of the opening between the radially inwardly extending circumferential protrusions can be for example between 30-200 mm, such as about 50-80 mm. The diameter of the second opening between the outer surfaces of the wall and excluding flanges can be for example between 35-300 mm, such as about 50-200.

The height of the sealing element, i.e. a height projection parallel to the centre line, and comprising the spherical sealing protrusion, the length of the first wall portion and including the length of the second wall portion can be between 15-200 mm, such as about 50-120 mm.

The sealing element can be said to have in an equal manner an essentially conical, frustoconical or funnel shape. The opening in the sound attenuation casing comprising the sealing element can also be said to have an essentially conical, frustoconical or funnel shape.

The present invention is of course not in any way restricted to the embodiments described above, but many possibilities to modifications, or combinations of the described embodiments thereof should be apparent to a person with ordinary skill in the art without departing from the basic idea of the invention that is defined in the appended claims.

The invention claimed is:

1. A terminal bushing sealing element, adapted to be fitted between a terminal bushing and a barrier element, which sealing element is elastic, has an annular shape, and comprises a wall with an inner surface and an outer surface,
    wherein a first opening is provided at a first end of the sealing element and a second opening is provided at a second end of the sealing element, which is opposite to the first end, the wall extending between the first end and the second end,
    wherein the wall comprises a first wall portion that is inclined such that a diameter of the sealing element increases from the first end in the direction towards the second end, and
    wherein the first wall portion adjacently to the first end of the sealing element is provided with a radially inwardly extending circumferential protrusion and the protrusion is arc shaped and extends essentially in the direction away from the first end towards the second end and forms a circumferential open channel with the first wall portion.

2. The sealing element according to claim 1, wherein the first wall portion is inclined with an angle in relation to a centre line of the sealing element, wherein the angle is between 1°-45°.

3. The sealing element according to claim 1, wherein a spherical sealing protrusion is integrated with the first end, forming a convex inner surface of the first end.

4. The sealing element according to claim 1, wherein a first, radially outwardly extending circumferential flange is provided at the first end and a second radially outwardly extending circumferential flange is provided at a distance from the first flange, the flanges forming a first outer groove with the first wall portion.

5. The sealing element according to claim 4, wherein the second flange is tapered in a direction radially outwards from the wall.

6. The sealing element according to claim 1, wherein the wall comprises a second wall portion that extends beyond the first wall portion in the direction away from the first end, wherein the second wall portion comprises at least one radially outwardly directed circumferential flange means and a second outer groove.

7. The sealing element according to claim 6, wherein a slit is provided in the wall separating the second wall portion and the first wall portion.

8. A sound attenuation casing for a capacitor unit, comprising the sealing element according to claim 1, wherein the sound attenuation casing forms the barrier element, the sound attenuation casing being provided with at least one opening through which the terminal bushing extends, wherein the sealing element is adapted to be fitted in the at least one opening.

9. The sound attenuation casing according to claim 8, wherein the at least one opening is conical and has a larger diameter towards an outer surface of the casing, wherein conicity of the opening corresponds to the inclination of the first wall portion of the sealing element.

10. The sound attenuation casing according to claim 8, wherein the sound attenuation casing comprises a base and four side walls extending perpendicular to the base and surrounding the base, wherein the base comprises the at least one opening.

11. The sound attenuation casing according to claim 10, further comprising a sealing gasket, which is adapted to be fitted between the side walls of the sound attenuation casing and a capacitor unit.

12. A capacitor sound attenuation arrangement, comprising the sound attenuation casing according to claim 8.

13. The capacitor sound attenuation arrangement according to claim 12, further comprising a sound attenuation enclosure enclosing the sound attenuation casing, the sound attenuation enclosure having at least one opening through which the terminal bushing extends.

14. The capacitor sound attenuation arrangement according to claim 13, wherein the case where the sealing element comprises a second outer groove, the second outer groove is adapted to be fitted to the at least one opening of the sound attenuation enclosure.

15. A power capacitor arrangement comprising a capacitor unit and the capacitor sound attenuation arrangement according to claim 12.

16. The power capacitor arrangement according to claim 15, wherein the capacitor unit comprises at least one terminal bushing and the sealing element is arranged in abutment with a shed of the terminal bushing, which shed is the shed closest to the capacitor unit.

17. The power capacitor arrangement according to claim 16, wherein the radially inwardly extending circumferential protrusion of the sealing element is arranged in abutment with the shed.

18. The power capacitor arrangement according to claim 15, wherein the first end of the sealing element is arranged in abutment with a base of the terminal bushing.

* * * * *